US008157382B2

(12) United States Patent
Hasegawa et al.

(10) Patent No.: US 8,157,382 B2
(45) Date of Patent: Apr. 17, 2012

(54) IMAGE DISPLAY SYSTEM AND METHOD, AND SCREEN DEVICE

(75) Inventors: Hiroshi Hasegawa, Chino (JP); Akihiko Yamamoto, Yamagata-mura (JP); Toshiki Fujimori, Shimosuwa-machi (JP); Noritaka Uchibori, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 576 days.

(21) Appl. No.: 12/055,879

(22) Filed: Mar. 26, 2008

(65) Prior Publication Data
US 2008/0239243 A1 Oct. 2, 2008

(30) Foreign Application Priority Data

Mar. 26, 2007 (JP) ................................. 2007-078438
Dec. 17, 2007 (JP) ................................. 2007-324326

(51) Int. Cl.
*G03B 21/00* (2006.01)
*G02B 27/22* (2006.01)
(52) U.S. Cl. ................................. 353/10; 353/7; 359/466
(58) Field of Classification Search .................... 353/10, 353/69, 70, 7, 94; 348/44; 352/86, 61, 57; 359/478, 458, 462, 466, 475, 479
See application file for complete search history.

(56) References Cited

U.S. PATENT DOCUMENTS

| 3,682,527 | A | | 8/1972 | Pirelli |
| 4,974,957 | A | | 12/1990 | Kaelin |
| 5,329,323 | A | * | 7/1994 | Biles ............................... 353/10 |
| 6,040,941 | A | * | 3/2000 | Miwa et al. .................... 359/443 |
| 6,846,081 | B2 | * | 1/2005 | Mochizuki et al. ............. 353/70 |
| 7,587,120 | B2 | * | 9/2009 | Koo et al. ...................... 385/147 |
| 2005/0200951 | A1 | * | 9/2005 | Redmon ........................ 359/443 |

FOREIGN PATENT DOCUMENTS

| CA | 2 029 834 A1 | 5/1992 |
| JP | A 04-287032 | 10/1992 |
| JP | A 07-056235 | 3/1995 |
| JP | A-11-218844 | 8/1999 |
| JP | A-2005-234114 | 9/2005 |
| JP | A-2006-106135 | 4/2006 |
| WO | WO 93/19396 | 9/1993 |

* cited by examiner

*Primary Examiner* — William C Dowling
*Assistant Examiner* — Ryan Howard
(74) *Attorney, Agent, or Firm* — Oliff & Berridge, PLC

(57) ABSTRACT

An image display system that includes: a projector; and a screen device that displays a projection image being a projection result from the projector. In the image display system, the screen device includes a plurality of light diffusion units each having characteristics of light transmission and characteristics of light diffusion, and among the plurality of light diffusion units, the projection image is diffused by a second light diffusion unit after passing through a first light diffusion unit.

23 Claims, 12 Drawing Sheets

IMAGE DISPLAY SYSTEM AND METHOD, AND SCREEN DEVICE

This application claims priority from Japanese Patent Application No. 2007-078438 filed in the Japanese Patent Office on Mar. 26, 2007, and Japanese Patent Application No. 2007-324326 filed in the Japanese Patent Office on Dec. 17, 2007, the entire disclosures of which are hereby incorporated by reference in their entireties.

BACKGROUND

1. Technical Field

The present invention relates to an image display system and method for image display using projectors, and a screen device for use in the image display system.

2. Related Art

A projector being an image display device of projector type indispensably requires a screen for reproduction of projection images. The screen equipped to a projector for display of projection images is categorized in type, e.g., hard type being hard and not easily broken and soft type being easy to store and move, and front-projection type and rear-projection type depending on the projection direction of a projector.

No matter what type the screen in use is, the screen is an obstacle for people or others to move, and is viewable only with limited direction. As a result, an image display system being the combination of a projector and a screen can be used only in limited places such as meeting rooms and movie theaters.

For betterment the new types of screen appear such as "fog screen" and "white smoke screen" (as examples, refer to Patent Documents 1 (JP-A-4-287032) and 2 (JP-A-7-56235).

The technology of Patent Document 1 (referred to as first previous technology) is of forming a screen (fog screen) by generation of fog uniformly on a plane, and on the resulting fog screen, displaying images coming from an image projection device such as projector. Such a fog screen does not get in the way of people to move, and for example, people can walk into the screen, place any object in the screen, and pass through the screen.

Accordingly, such a fog screen may be formed on paths in airports, stations, hospitals, shopping malls, and others to make it serve as a guideboard of showing the way to go to destinations and displaying various types of information. The fog screen may also be used for various types of events and exhibitions to make it function as means for producing new effects. As such, the combination of a fog screen and a projector can construct an image display system of a new type.

The technology of Patent Document 2 (referred to as second previous technology) is of forming a screen (white smoke screen) by generation of white smoke, and on the resulting white smoke screen, displaying images coming from an image projection device such as projector. Also with such a white smoke screen, similarly to a fog screen, people can walk into the screen, place any object in the screen, and pass through the screen. The white smoke screen is thus available for similar uses as a fog screen.

The problem here is that when such a fog or white smoke screen is disposed on a path, for example, when any person or object exists between the screen and an image projection device such as projector, the person or object obstructs projection lights. If this is the case, the shadow of the person or that of the object appears on the image on the screen, thereby blocking other viewers' view.

SUMMARY

An advantage of some aspects of the invention is to provide an image display system and method that are capable of image display without being influenced by existence of human beings and objects, and a screen device for use with the image display system.

In a first aspect of the invention, an image display system includes: a projector; and a screen device that displays a projection image being a projection result from the projector. In the image display system, the screen device includes a plurality of light diffusion units each having characteristics of light transmission and characteristics of light diffusion, and among the plurality of light diffusion units, the projection image is diffused by the second light diffusion unit after passing through the first light diffusion unit.

In the first aspect of the invention, an image display system includes a plurality of light diffusion units, each of which is provided with characteristics of light transmission and characteristics of light diffusion. With such a configuration, the light diffusion units each separately display projection images coming from the projector. As such, even when any person walks in the screen device or any object is placed in front of such screen device, image display is always being made by any of the light diffusion units. This preferably enables people in the vicinity of the screen device to view the projection images without being annoyed by whatever is found in the screen device, e.g., person and object.

In a second aspect, in the image display system of the first aspect, preferably, the projector is plurally provided for image projection from various directions with respect to the screen device.

As such, image projection is made from various directions by a plurality of projectors. Even when a projection image from any one of the projectors is blocked by a person or others, another image projected by any of the remaining projectors is accordingly displayed. This thus enables projection image display without being influenced by existence of a person or others found in the screen device if any.

In a third aspect of the invention, in the image display system of the second aspect, when two of the projectors are disposed to face each other on one and the other sides with the screen device disposed therebetween, the projector disposed on the other side projects a mirror image of the projection image coming from the projector disposed on the one side.

As such, the projector on the other side provides the mirror image of a projection image coming from the projector on one side. With such image projection, even if a projection image from one of the projectors is blocked by a person getting in the way of the screen device, the remaining projector provides the mirror image of the projection image. This favorably makes information on the screen device available not only to the person in the screen device but also to other people therearound.

In a fourth aspect of the invention, in the image display system of any one of the first to third aspects, preferably, the light diffusion units are each made of a fabric material that can move to swing under external forces.

With the light diffusion units each being made of a soft fabric material, people can easily walk into the space between any two of the light diffusion units, and objects can be easily placed on the space therebetween, for example. Note here that the fabric material satisfying the conditions having the characteristics of light transmission and characteristics of light diffusion and being able to move to swing when any external forces are applied includes super-ultra thin fabrics of super-ultra thin fibers having 7 deniers or less.

In a fifth aspect of the invention, in the image display system of any one of the first to fourth aspects, preferably, the light diffusion units are each provided with at least a slit.

With the light diffusion units each having a slit, people can pass through the screen device along the projection direction of the projectors. This accordingly widens the usage of the image display system of the aspect of the invention, e.g., the image display system may be disposed on a path inside of a building or others for display of a guideboard of showing the way to go and for display of various types of information.

In a sixth aspect of the invention, in the image display system of any one of the first to fifth aspects, preferably, the light diffusion units are disposed to derive a placement in which a light transmission surface of any one of the light diffusion units is faced to a light diffusion surface of any other one of the light diffusion units adjacent in a projection direction of the projector.

This is an exemplary placement of the light diffusion units, and when the light diffusion units are each exemplarily a flat sheet, the light diffusion units are disposed in a line in such a manner that the sheet surface of one of the light diffusion units is opposed to the other sheet surfaces of the remaining light diffusion units. With such a placement of a plurality of light diffusion units, when the projector projects an image, the projection image is displayed on each of the light diffusion units, which are disposed along the projection direction of the projectors.

In a seventh aspect of the invention, in the image display system of any one of the first to fifth aspects, preferably, the light diffusion units are disposed to form a plurality of loops when the screen device is viewed from above, and the plurality of loops are disposed to from a plurality of layers.

This is another exemplary placement of the light diffusion units, and with such a placement, the resulting screen device can be three-dimensional. With image projection to such a screen device using projectors from various angles, the resulting images can be each provided with a three-dimensional appearance.

In an eighth aspect of the invention, in the image display system of the seventh aspect, preferably, the loops are each in a circular shape.

With such a placement of the light diffusion units, the resulting screen device looks like a cylinder when viewed from the outside. With image projection to such a screen device using projectors from various angles, the resulting images can be also each provided with a three-dimensional appearance, and the images are displayed differently from those by any previous two-dimensional screen device.

In a ninth aspect of the invention, in the image display system of the seventh aspect, preferably, the loops are each in a polygonal shape.

With such a placement of the light diffusion units, the resulting screen device looks like a polygonal prism when viewed from the outside. With image projection to such a screen device using projectors from various angles, similarly to the screen device shaped like a cylinder, the resulting images can be each provided with a three-dimensional appearance, and the images are displayed differently from those by any previous two-dimensional screen device.

In a tenth aspect of the invention, in the image display system of any one of the first to fifth aspects, preferably, the light diffusion units are disposed in a lattice when the screen device is viewed from above.

Such a placement of the light diffusion units enables image projection with projectors disposed around a screen device, i.e., image projection against four surfaces of the screen device, thereby being able to display images differently from those by any previous two-dimensional screen device. The images are also displayed differently from those by any screen device shaped like a cylinder or a polygonal prism.

In an eleventh aspect of the invention, an image display method of displaying a projection image being a projection result from a projector includes displaying the projection image onto a screen device including a plurality of light diffusion units each having characteristics of light transmission and characteristics of light diffusion, and among the plurality of light diffusion units, the projection image is diffused by the second light diffusion unit after passing through the first light diffusion unit.

With image display with such a method, the effects similar to those achieved by the image display system of the first aspect can be favorably achieved. Note here that the image display method of the eleventh aspect of the invention is preferably provided with the characteristics similar to those of the image display systems of the second to tenth aspects of the invention.

In a twelfth aspect of the invention, a screen device displays a projection image being a projection result from a projector. In the screen device, a plurality of light diffusion units each having characteristics of light transmission and characteristics of light diffusion are provided, and among the plurality of light diffusion units, the projection image is diffused by the second light diffusion unit after passing through the first light diffusion unit.

The screen device of such a configuration is combined with a plurality of projectors so that the resulting image display system of the first aspect of the invention can be derived. Note here that the screen device of the twelfth aspect of the invention is preferably provided with the characteristics similar to those of the image display systems of the second to tenth aspects of the invention.

BRIEF DESCRIPTION OF THE DRAWINGS

Embodiments of the invention will be described by way of example only with reference to the accompanying drawings, wherein like numbers reference like elements.

DETAILED DESCRIPTION OF EMBODIMENTS

In the below, embodiments of the invention are described.

First Embodiment

Figure 1:
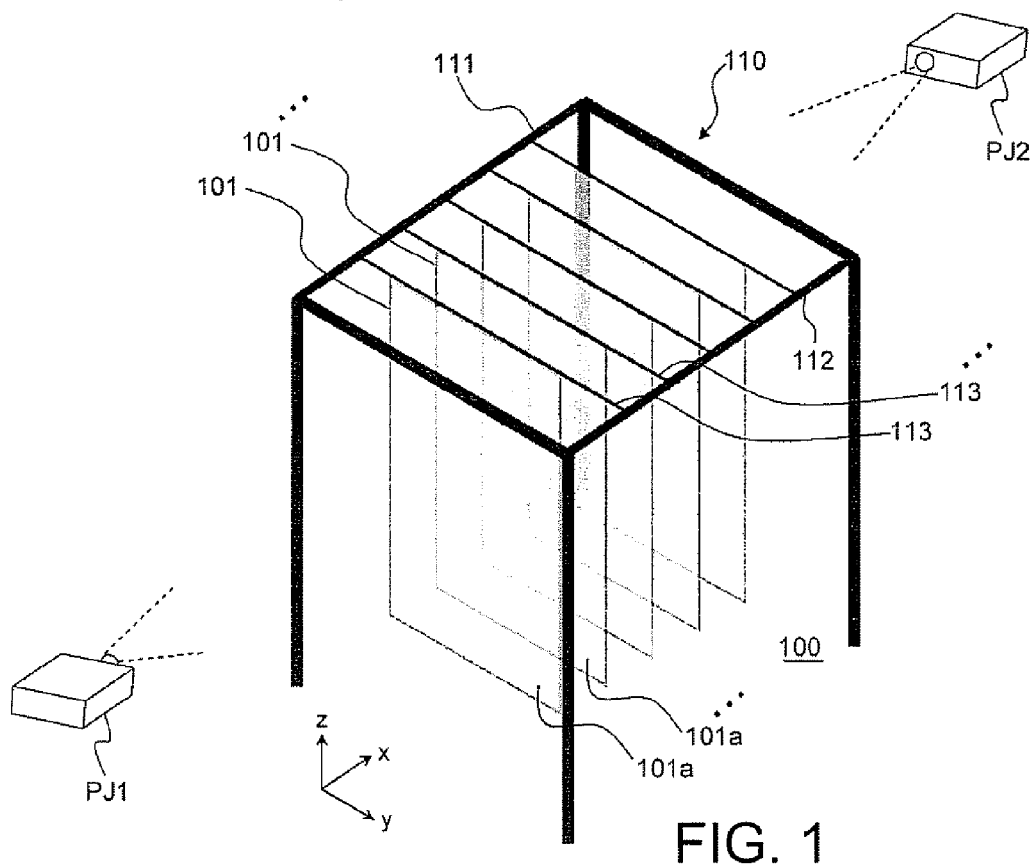
FIG. 1 is a diagram showing the configuration of an image display system of a first embodiment.

FIG. 1 is a diagram schematically showing the configuration of an image display system of a first embodiment. The image display system of the first embodiment is configured to include a screen device 100, and at least one projector PJ (two projectors PJ1 and PJ2 in the first embodiment). The screen device 100 includes a plurality of screens 101 each serving as light diffusion units, and a support device 110 that supports the screens 101 in such a manner that their screen surfaces 101a are opposed to each other with a predetermined interval in the direction of an x-axis in FIG. 1. The projectors PJ1 and PJ2 each perform image projection with respect to the screen device 100 from each different direction for image display on the screen surfaces 101a of the screens 101.

The screens 101 each have the characteristics of light transmission (light transmission characteristics) and the characteristics of light diffusion (light diffusion characteristics), and are each made of a thin and soft fabric material. The screens 101 are each preferably provided with the light transmittance higher than the light diffusivity.

Fabric material satisfying the conditions of having the characteristics of both light transmission and light diffusion, being thin and soft, and having the light transmittance higher than the light diffusivity includes super-ultra thin fabrics of super-ultra thin fibers having 7 deniers or less. Super-ultra thin fabrics of super-ultra thin fibers having 7 deniers or less as such are exemplified by a super-ultra thin fabric called super organza.

The support device 110 is configured to include two frames 111 and 112 provided along the projection direction of the projectors, and a plurality of hanging members 113 that are placed across the frames 111 and 112 for hanging use of the screens 101. Note here that the support device 110 is not restricted to such a configuration as shown in FIG. 1, and can be of various configurations depending on the placement position of the image display system of the embodiment of the invention.

The screens 101 are only hung from the hanging members 113 like curtains, and are not under the tension at least in the vertical direction, i.e., z-axis direction in the drawing. Note here that, the screens 101 are preferably hung from the hanging members 113 in such a manner as to keep the screen surfaces 101a of the screens 101 from being largely wrinkled in the lateral direction, i.e., y-axis direction in FIG. 1.

As such, the screen device 100 is configured only by the screens 101 being hung like curtains from the hanging members 113 of the support device 110, and the screens 101 are each made of a soft and thin fabric. This enables people to walk into the space between the screens, or objects to be placed on the space therebetween.

One of the projectors PJ1 and PJ2 (PJ1 in this embodiment) is so set as to perform image projection in a front-projection mode. The remaining projector (PJ2 in this embodiment) is so set as to perform image projection in a rear-projection mode. That is, the projector PJ2 is so set as to project the mirror image of an image projected by the projector PJ1.

Note that, in the image display system of the first embodiment and those in other embodiments below, the two projectors PJ1 and PJ2 are assumed as being designed to project any same information. This is surely not restrictive, and the projectors are each capable of displaying different information. The setting of the projectors PJ1 and PJ2, e.g., in which projection mode and what information is to be displayed, can be made in advance by an operator of the image display system of the embodiment of the invention, for example.

Figure 2:
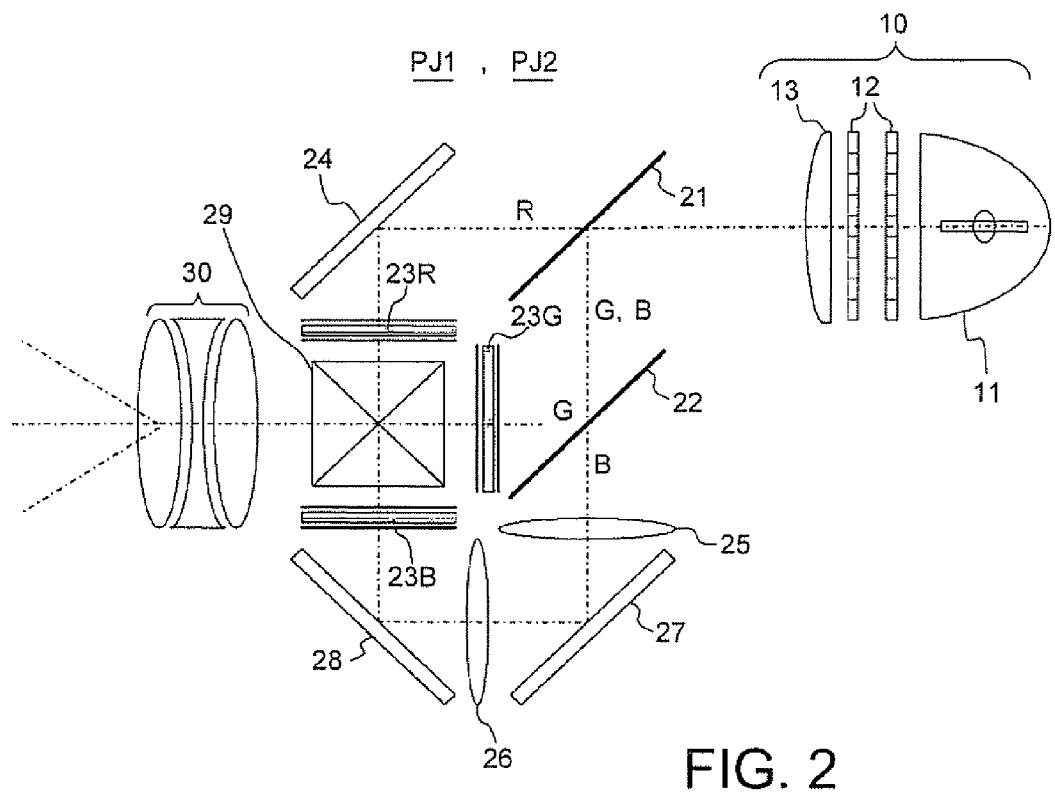
FIG. 2 is a diagram schematically showing the configuration of a projector PJ1 and that of a projector PJ2.

FIG. 2 is a diagram schematically showing the configuration of an optical system in the projectors PJ1 and PJ2. As shown in FIG. 2, the projectors PJ1 and PJ2 are each configured to include a light source device 10, a first dichroic mirror 21, a second dichroic mirror 22, light modulation elements (liquid crystal panels) 23R, 23G, and 23B, a reflection mirror 24, relay lenses 25 and 26, reflection mirrors 27 and 28, a cross dichroic prism 29, and a projection system 30. The light source device 10 includes a light source 11, a lens array 12, and a superimposing lens 13. The first dichroic mirror 21 serves to separate a light coming from the light source device 10 into lights of red and lights of other colors, and the second dichroic mirror 22 serves to separate the lights of other colors being the separation results by the first dichroic mirror 21 into lights of green and blue. The light modulation elements 23 include a light modulation element 23R for modulation of lights of red, a light modulation element 23G for modulation of lights of green, and a light modulation element 23B for modulation of lights of blue. The reflection mirror 24 guides the lights of red to the light modulation element 23R after the lights passing through the first dichroic mirror 21. The relay lenses 25 and 26 and the reflection mirrors 27 and 28 serve to guide the lights of blue to the light modulation element 23B after the lights passing through the second dichroic mirror 22. The cross dichroic prism 29 combines together the lights being the modulation results by the light modulation elements 23R, 23G, and 23B. The projection system 30 projects image lights being the combination results by the cross dichroic prism 29.

Note here that the light modulation elements 23R, 23G, and 23B are surely not restrictive to those using a crystal material, and light modulation elements of a micromirror type will also do.

Figure 3A:
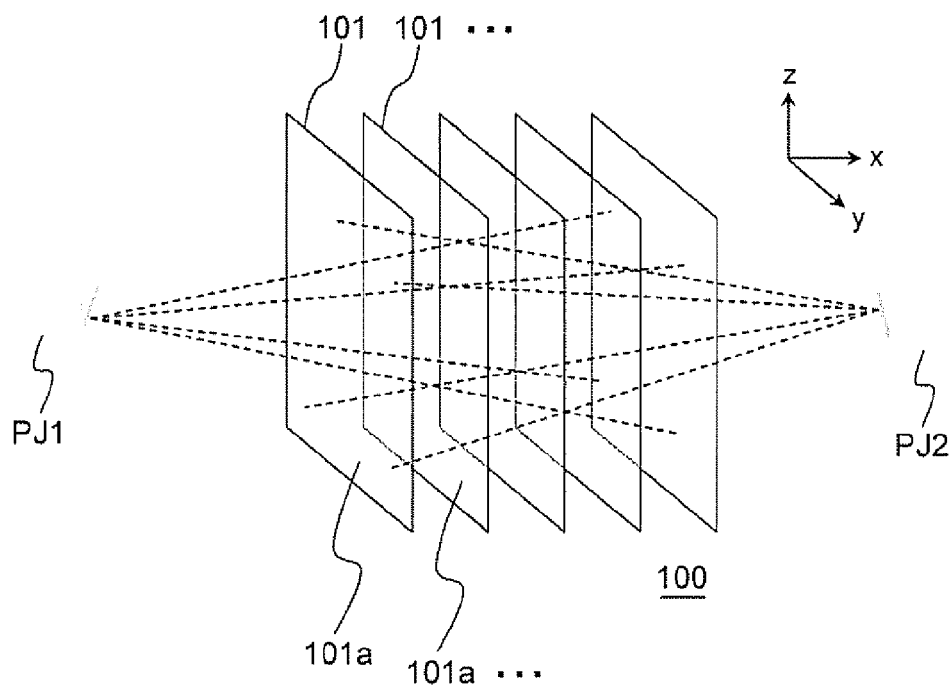
FIGS. 3A and 3B are each a diagram schematically showing the configuration of an image display system of a second embodiment.
Figure 3B:
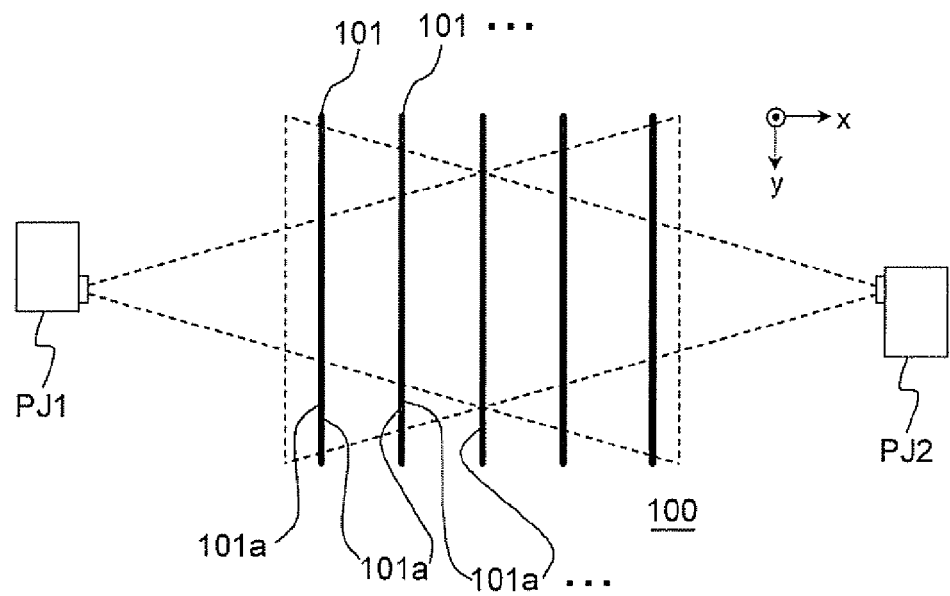

FIGS. 3A and 3B are diagrams schematically showing the configuration of the image display system of the first embodiment, i.e., showing the relationship between the screens 101 of the screen device 100 and the projectors PJ1 and PJ2 of FIG. 1. FIG. 3A is a perspective view of the image display system of the first embodiment, and FIG. 3B is a plan view of the image display system oft the first embodiment viewed from above. In FIGS. 3A and 3B, the support device 110 is not shown.

As shown in FIGS. 3A and 3B, the screen device 100 for use in the image display system of the first embodiment is in the configuration in which the screens 101 are disposed in such a manner that the screen surfaces 101a of the screens 101 are to opposed to each other. The screen surfaces 101a are disposed in parallel almost at regular intervals, e.g., interval of about several tens of centimeters.

Figure 4:
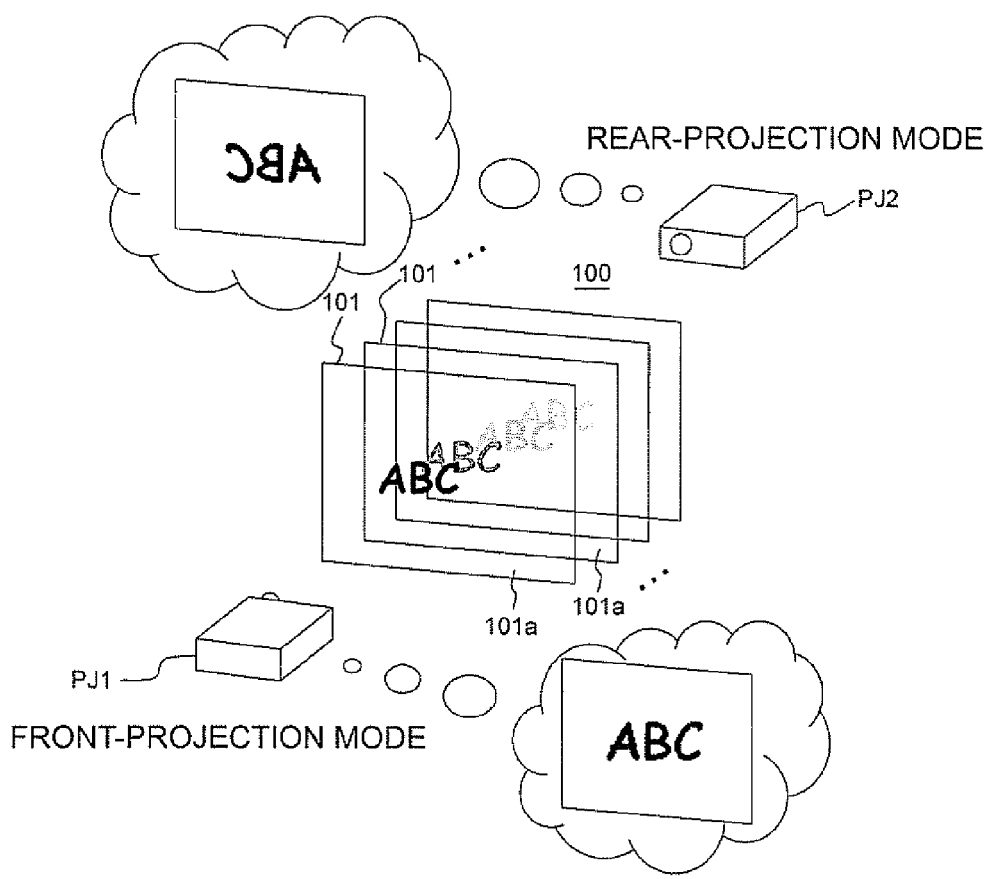
FIG. 4 is a diagram schematically showing the state in which the two projectors PJ1 and PJ2 perform image projection with respect to a screen device 100.

FIG. 4 is a diagram schematically showing the state in which the two projectors PJ1 and PJ2 perform image projection with respect to the screen device 100. As shown in FIG. 4, the projector PJ1 performs image projection in a front-projection mode, and the projector PJ2 performs image projection in a rear-projection mode. In FIG. 4, the projector PJ1 is projecting an image of "ABC" in the front-projection mode, and the projector PJ2 is also projecting the same image of "ABC" in the rear-projection mode, for example.

For such image projection, a setting is so made that the images from the projectors PJ1 and PJ2 are displayed at the same position on each of the screen surfaces 101a. Accordingly, when a viewer on the side of the projector PJ1 sees the image of "ABC", the image is displayed in the correct direction for the characters.

The screens 101 are each provided with the characteristics of light transmission and the characteristics of light diffusion, and their light transmittance is higher than the light diffusivity. Therefore, the images from the projectors PJ1 and PJ2 pass through the screen surfaces 101a of the screens 101, and are displayed on each of the screen surfaces 101a of the screens 101.

Note here that the closer the screen to the projectors PJ1 and PJ2, the likelier images projected by the projectors PJ1 and PJ2 look clearer. The display clearness of the images on the screens is reduced with the distance from the projectors PJ1 and PJ2. However, when the number of screens is five or so as in the image display system of the first embodiment, the display clearness can be of a sufficiently visible level for an image displayed on the screen located farthest away from the projectors PJ1 and PJ2.

With an image display system configured using such a screen device 100, images projected by the projectors PJ1 and PJ2 onto the screen device 100 are displayed as shown in FIG. 4 on the screen surfaces 101a of the screens 101. As such, in the image display system of FIG. 4, even if a person blocks projection lights coming from the projector PJ1 by walking into the screen device 100, i.e., into the space between the screens, for example, the person in the screen device 100 can see the image displayed on the screen device 100 because the projection image from the projector PJ2 is being displayed in the rear-projection mode. In this case, not only the person in the screen device 100 but also other people around the screen device 100 can see the image displayed on the screen device 100.

In the image display system of the embodiment of the invention, the lights from the light sources of the projectors PJ1 and PJ2 may enter the eyes of people because people can walk into the screen device 100. However, even if people walk into the screen device 100, they are to be exposed by projection lights via the screens 101. Therefore, compared with a case where the lights of the light sources of the projectors PJ1 and PJ2 directly enter the human eyes, the possible influence upon the eyes is considerably reduced.

Figure 5:
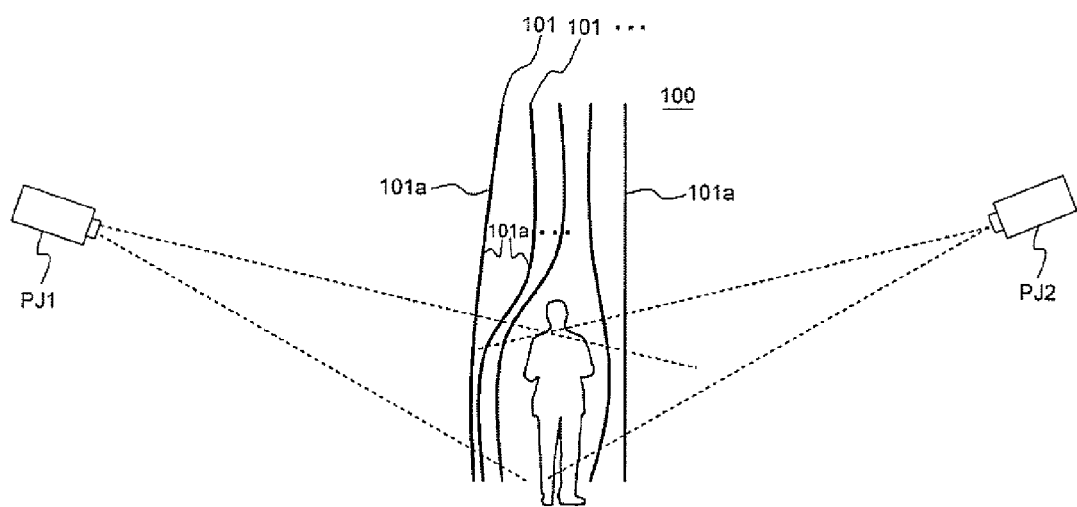
FIG. 5 is a diagram showing an exemplary placement of the projectors PJ1 and PJ2 with a consideration given to any possible influence over human eyes.

For reducing more the possible influence upon the human eyes, as shown in FIG. 5, the projectors PJ1 and PJ2 may be placed at the position sufficiently higher than the line of sight of people. With the projectors PJ1 and PJ2 placed at the position as shown in FIG. 5, the human eyes can be protected from lights of the lights sources of the projectors PJ1 and PJ2 directly entering thereinto. Note here that such a placement of the projectors PJ1 and PJ2 as FIG. 5 being preferable is true to the other embodiments that will be described later.

The image display system of the first embodiment allows people to get into the screen device 100 and objects to be placed thereinto, for example. This accordingly provides a way for various types of effects production with a combination of human beings, objects, and videos in various types of places, e.g., event sites, exhibition sites, showrooms, and restaurants. As such, the resulting image display system is of a completely new type compared with the previous systems. Especially because projection images from projectors are displayed on a plurality of screens with the dimension in depth so that moving images of natural phenomena such as flames and water can look real with a lot of textures. Moreover, text information and others can be displayed also with effect.

Figure 6A:
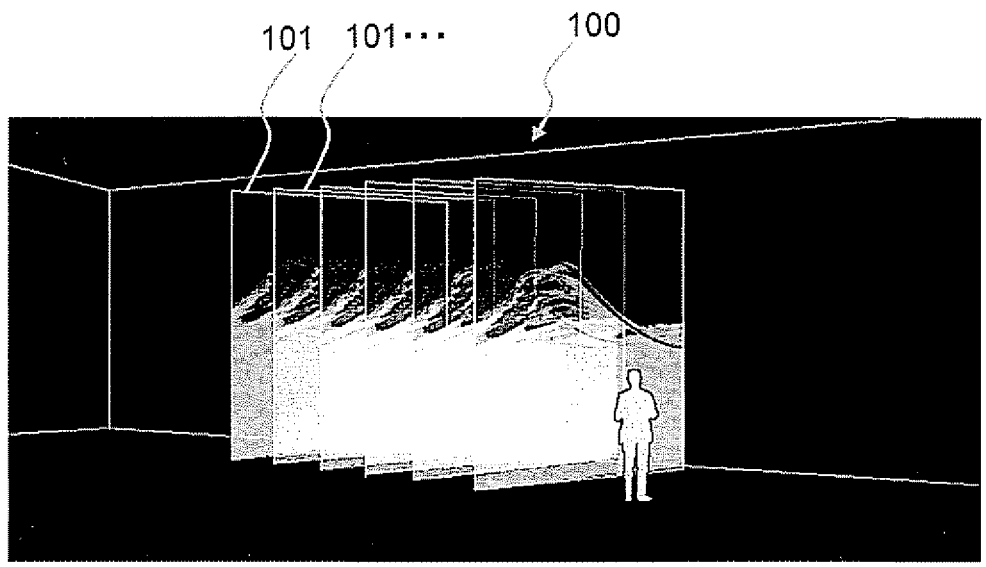
FIGS. 6A and 6B are each a diagram showing an exemplary use (first example) of the image display system of the first embodiment.
Figure 6B:
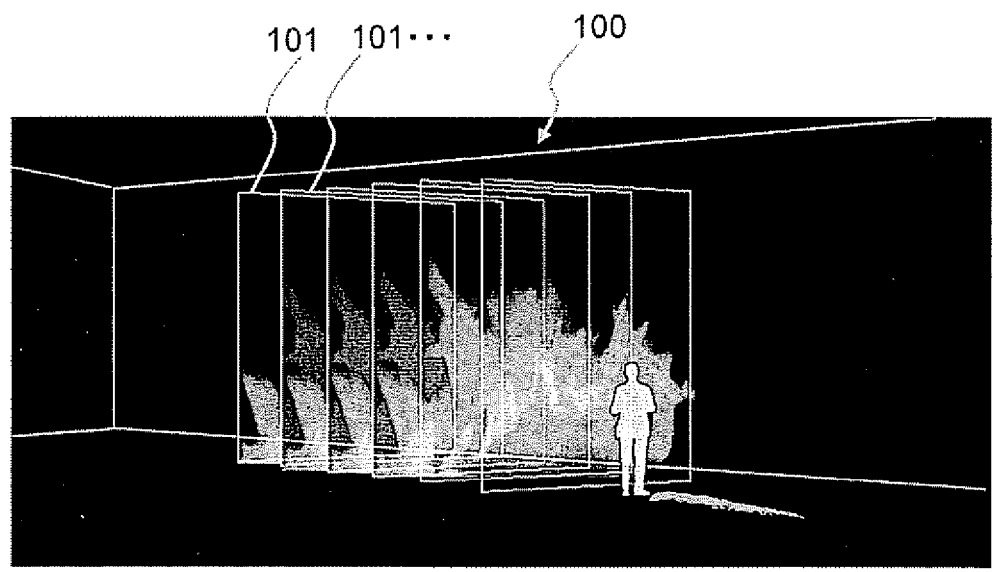

FIGS. 6A and 6B are each a diagram showing an exemplary use (first example) of the image display system of the first embodiment. FIG. 6A shows an exemplary case where moving images of waves are projected onto the screen device 100 from the projectors (FIGS. 6A and 6B show no projector), and FIG. 6B shows an exemplary case where moving images of flames are projected onto the screen device 100 from the projectors. As shown in FIGS. 6A and 6B, the moving images of waves and flames coining from the projectors are displayed in layers on a plurality of screens 101 so that the resulting video looks real with a lot of textures and the dimension in depth.

Figure 7:
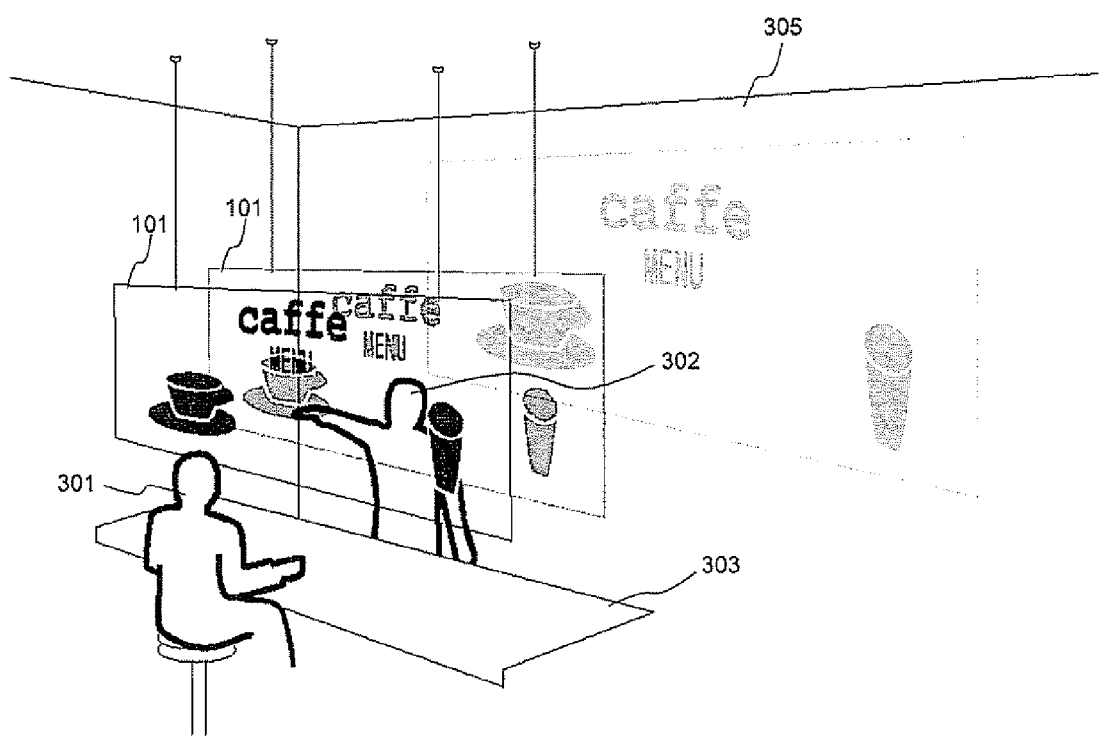
FIG. 7 is a diagram showing another exemplary use (second example) of the image display system of the first embodiment.

FIG. 7 is a diagram showing another exemplary use (second example) of the image display device of the first embodiment. FIG. 7 shows an exemplary case where the image display system of the first embodiment is used in a restaurant or a café, e.g., a plurality of screens 101 (two in FIG. 7 example) are hung from the ceiling above a counter 303 where a customer 301 sits across a waiter 302. This is the exemplary case where the two screens 101 are used as a menu board, and projectors (not shown in FIG. 7) are projecting images of menu items, for example.

When the image display system of the first embodiment is used as in the case of FIG. 7, the screens 101 are both made of a thin and soft fabric material, and the level of "see-through" transparency is high. Accordingly, the customer 301 and the waiter 302 do not feel constrained by the existence of the screens 101, and any new atmosphere can be created in the restaurant or café by the screens 101. Herein, because the screen is plurally provided also in this case, i.e., two in FIG. 7 example, even when a person is positioned between the screens, i.e., the waiter 302 in FIG. 7 example, the menu is visible from various directions in the restaurant or café. Note that, in FIG. 7, the image projected farthest away from the position of the customer 301 is the image displayed on a wall 305, i.e., the image passed through the second screen 101.

As described above, the image display system of the first embodiment is of a completely new type compared with the previous systems, and when used in various types of places, e.g., event sites, exhibition sites, showrooms, and restaurants, the image display system can be strikingly new and conspicuous. What is better, the image display system of the first embodiment requires no large-scale installation, and can be set up easily with low cost. The image display system is also easy to move, thereby being available in various types of fields with no detailed preparation.

Second Embodiment

Figure 8A:
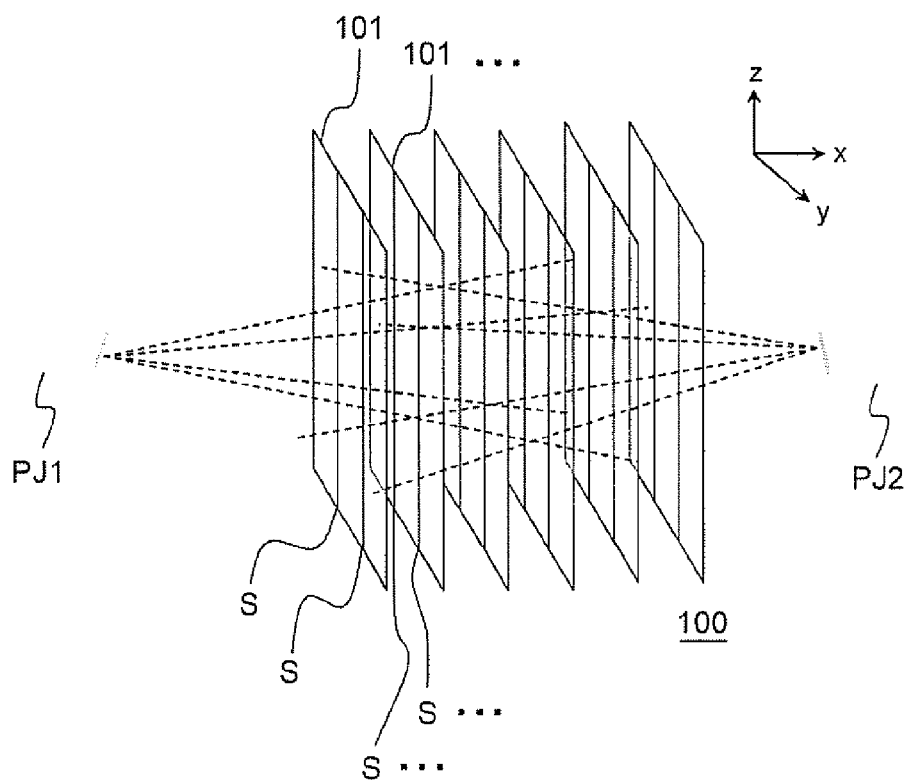
FIGS. 8A and 8B are each a diagram schematically showing the configuration of the image display system of the second embodiment.
Figure 8B:
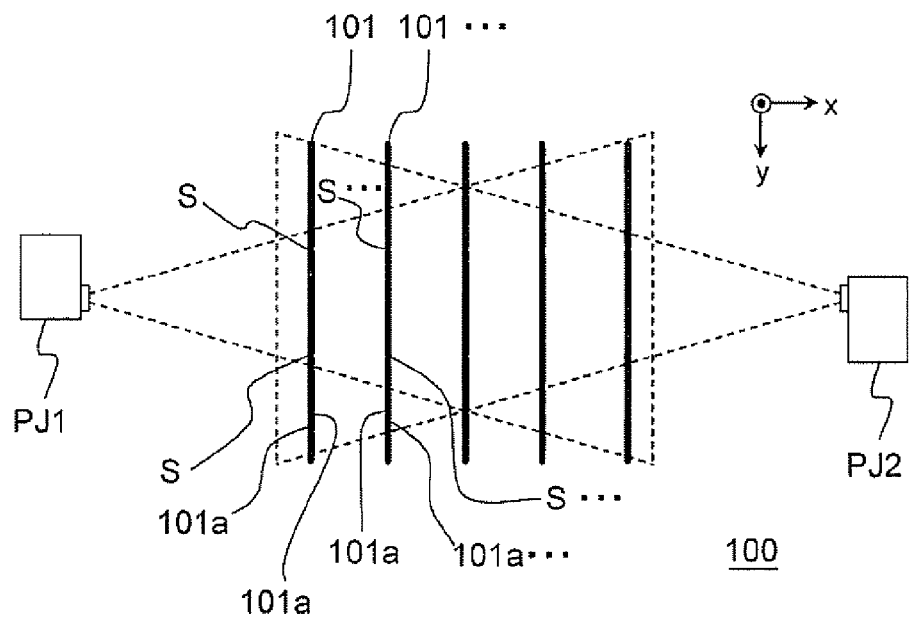

FIGS. 8A and 8B are each a diagram schematically showing the configuration of an image display system of a second embodiment. FIGS. 8A and 8B are each a diagram corresponding to FIGS. 3A and 3B referred to for describing the image display system of the first embodiment, i.e., FIG. 8A is a perspective view of the image display system, and FIG. 8B is a plan view of the image display system viewed from above. In FIGS. 8A and 8B, the entire configuration including the support system 110 and others is similar to that of FIG. 1.

In the image display system of the second embodiment, the screen surfaces 101a of the screens 101 configuring the screen device 100 are each provided with at least a slit S in the vertical direction, i.e., z-axis direction in FIGS. 8A and 8B.

FIGS. 8A and 8B show an example in which two slits S formed in the vertical direction are disposed at regular intervals. In FIGS. 8A and 8B examples, the slits S are formed from the lower to upper ends of each of the screens 101, but the slits are not necessarily formed up to the upper end.

With the image display system of the second embodiment, the screen device 100 is so configured as shown in FIGS. 8A and 8B so that people can get into the space between screens as with the image display system of the first embodiment. Furthermore, with the image display system of the second embodiment, people can move along the projection direction of the projectors PJ1 and PJ2, i.e., x-axis direction in FIGS. 8A and 8B. That is, the slits S formed to the screens 101 enable people to sequentially move from one screen 101 to another, and in the course of such movement, people can pass through the screen device 100 along the projection direction of the projectors PJ1 and PJ2.

With the image display system of the second embodiment, people can pass through the screen device 100 along the projection direction of the projectors. As such, in addition to the use of the image display system of the first embodiment, the image display system of the second embodiment is available for use to display guideboards and various types of information by being placed on a path or others in any large-sized building such as airport, station, hospital, and shopping malls.

Figure 9:
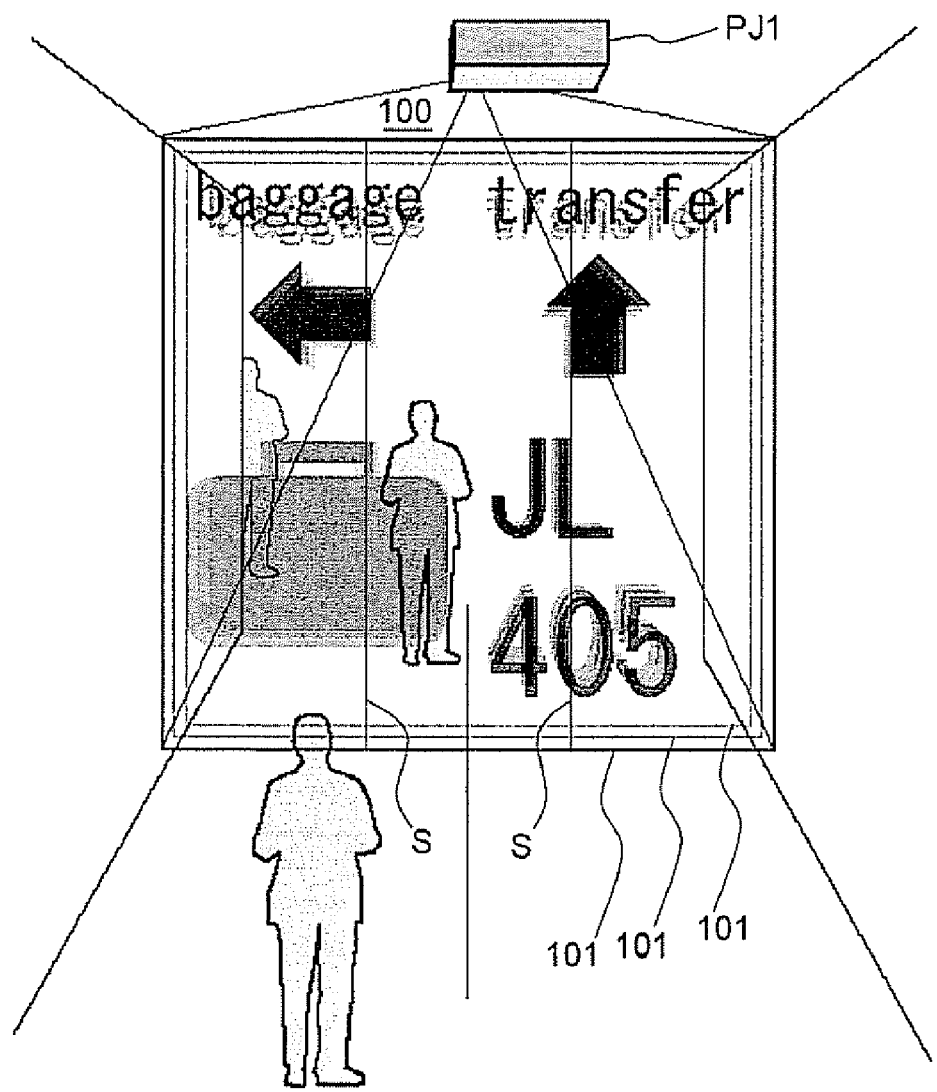
FIG. 9 is a diagram showing an exemplary use of the image display system of the second embodiment.

FIG. 9 is a diagram showing an exemplary use of the image display system of the second embodiment. In FIG. 9 example, the image display system of the second embodiment is placed on a path in an airport building, and the screen device 100 is used as a guideboard.

By placing the screen device 100 as shown in FIG. 9, the screen device 100 is located in front of people walking in the heading direction. This allows the people to see the guidance display projected on the screens 101 of the screen device 100 without moving their eyes that such. What is better, the people never fail to see the guidance display, and can easily know where to go. Because the screens 101 are each made of a thin and soft fabric material, and because the screens 101 are each formed with a slit(s) S, the screens 101 never get in the way of walking people.

Moreover, the screen device 100 is configured by a plurality of screens 101, and every screen 101 displays the projected guidance display. As such, even if any other people are walking through the screen device 100, the people in the screen device 100 do not block the other people's view of the guidance display.

Third Embodiment

Figure 10A:
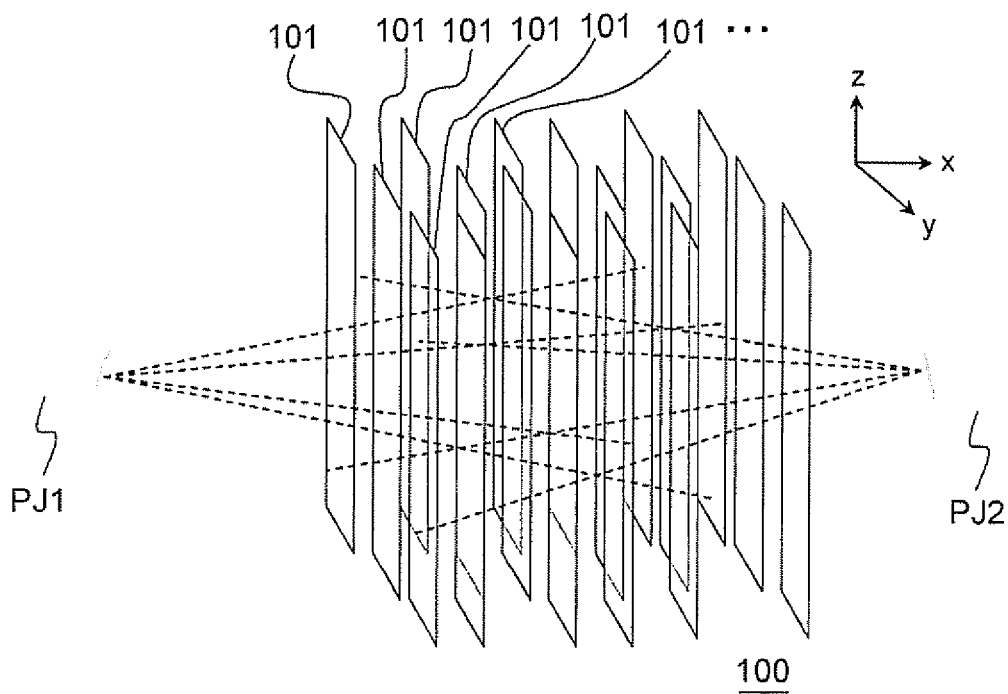
FIGS. 10A and 10B are each a diagram schematically showing the configuration of an image display system of a third embodiment.
Figure 10B:
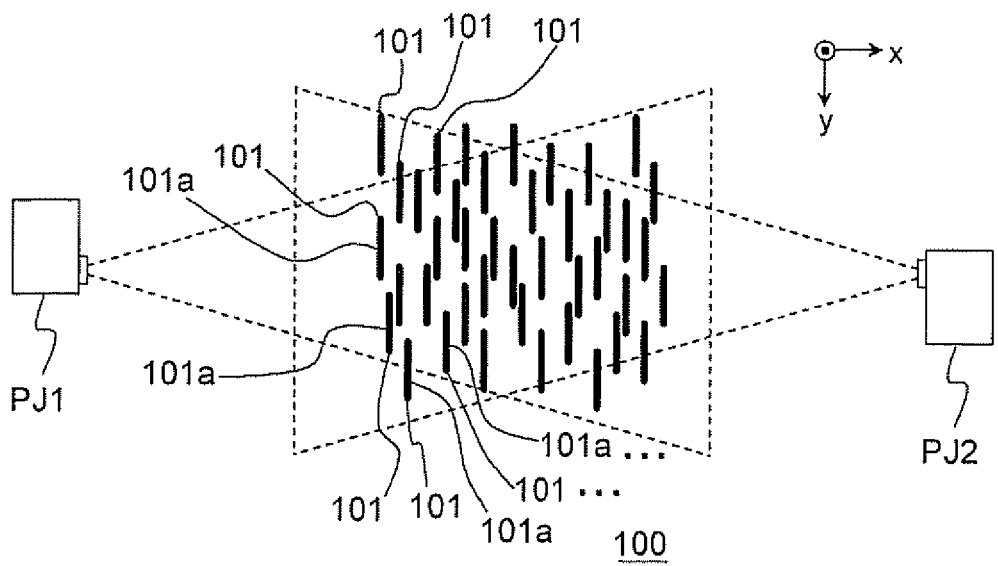

FIGS. 10A and 10B are each a diagram schematically showing the configuration of an image display system of a third embodiment. FIGS. 10A and 10B are each a diagram corresponding to FIGS. 3A and 3B referred to for describing the image display system of the first embodiment, i.e., FIG. 10A is a perspective view of the image display system, and FIG. 10B is a plan view of the image display system viewed from above. In FIGS. 10A and 10B, the entire configuration including the support system 110 and others is similar to that of FIG. 1.

In the image display system of the third embodiment, the screens 101 of the screen device 100 are each formed narrower in width in the lateral direction, i.e., y-axis direction in FIGS. 10A and 10B compared with the screens 101 of the screen device 100 in the image display systems of the first and second embodiments of the invention. Such screens narrower in width (hereinafter referred to as belt-shaped screens 101) are disposed at random in the projection direction of the projectors PJ1 and PJ2, and in the direction across the projection direction.

To be specific, as shown in FIGS. 10A and 10B, in the direction across the projection direction of the projectors PJ1 and PJ2, i.e., y-axis direction in FIGS. 10A and 10B, the belt-shaped screens 101 are disposed at random in number and interval. Also in the projection direction of the projectors PJ1 and PJ2, i.e., x-axis direction in FIGS. 10A and 10B, the belt-shaped screens 101 are disposed at random in number and interval.

For the placement of the belt-shaped screens 101 at random as shown in FIGS. 10A and 10B, it is preferred to prevent a failure of image projection, i.e., the projection images coming from the projectors partially pass through the screen device 100 without being displayed on the screens. For the purpose, preferably, when the screen device 100 is viewed from one side thereof along the projection direction of the projectors, i.e., x-axis direction in FIGS. 10A and 10B, the belt-shaped screens 101 are placed without forming such a large clearance as to provide clear sight to the other side of the screen device 100. In other words, it is preferred that at least one belt-shaped screen is always disposed in the line of sight of a person looking in the x-axis direction irrespective of the person's position in the y-axis direction in front of the screen device 100.

With the screen device configured as shown in FIGS. 10A and 10B in the image display system of the third embodiment, similarly to the image display system of the second embodiment, people can pass through the screen device 100 along the projection direction of the projectors PJ1 and PJ2. Moreover, with the image display system of the third embodiment, the belt-shaped screens 101 are disposed at random, thereby being available for various types of uses with a higher flexibility.

Note that, in FIGS. 10A and 10B example, the belt-shaped screens 101 are so placed that the screen surfaces 101a of the belt-shaped screens 101 found in the projection direction of the projectors PJ1 and PJ2 are parallel to one another. This is surely not restrictive, and the screen surfaces 101a may be oriented also at random, e.g., any screen surfaces 101a opposing each other may be parallel, but any screen surfaces 101a opposing each other may be angled to some degree. Where screen surfaces are parallel to each other, they need not be parallel to the y-axis direction.

Fourth Embodiment

Figure 11:
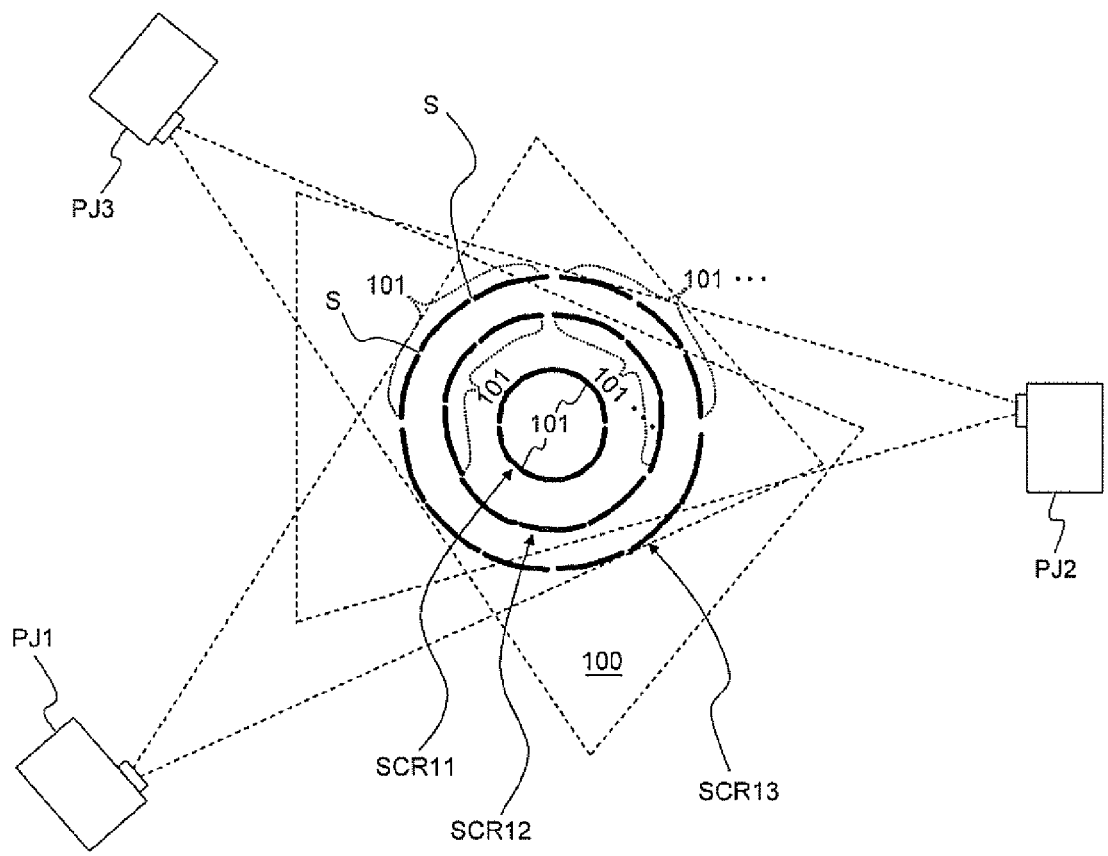
FIG. 11 is a diagram schematically showing the configuration of an image display system of a fourth embodiment.

FIG. 11 is a diagram schematically showing the configuration of an image display system of a fourth embodiment. FIG. 11 is a plan view of the image display system viewed from above similarly to FIG. 3B referred to for describing the image display system of the first embodiment. Note that, in FIG. 11, the entire configuration including the support system 110 and others is similar to that of FIG. 1.

In the image display system of the fourth embodiment, the screens for use in the screen device 100 may be any of those used in the screen device 100 of the image display systems in the first to third embodiments, i.e., the screens 101 (refer to FIGS. 3A and 3B), the screens 101 each formed with a slit S (refer to FIGS. 8A and 8B), and the screens 101 each shaped like a belt (refer to FIGS. 10A and 10B). In FIG. 11 example, exemplified is a case of using the screens 101 each formed with a slit S.

As shown in FIG. 11, in the image display system of the fourth embodiment, when the screen device 100 is viewed from above, the screens 101 are so disposed as to form a plurality of loops, and the loops are so disposed as to form a plurality of layers. In the image display system of FIG. 11, the loops are each shaped like a circle, and the circles are disposed concentrically. Note here that some positional deviation may be allowed in terms of center of the circles, and the loops are not each necessarily a perfect circle, and may be distorted to some degree. The loops are not each necessarily a circle but may be an ellipse.

With the screens 101 placed as shown in FIG. 11, the screen device 100 of the image display system of the fourth embodiment is configured by three cylindrical-shaped screens sharing the same center axis. These three cylindrical-shaped screens are hereinafter referred to as, from the one closest to the center axis, first cylindrical screen SCR 11, second cylindrical screen SCR 12, and third cylindrical screen SCR 13.

The first cylindrical screen SCR 11 is configured by the two screens 101, the second cylindrical screen SCR 12 is configured by the three screens 101, and the third cylindrical screen SCR 13 is configured by the four screens 101.

Note here that the screens configuring the first to third cylindrical screens SCR 11 to SCR 13 are not restrictive in number to those in FIG. 11 example. The number of the screens can be surely changed as appropriate depending on the size of the screen device 100 in its entirety or others. Moreover, the first to third cylindrical screens SCR 11 to SCR 13 are not necessarily required to have the same center axis, and some positional deviation is allowed.

In the image display system of FIG. 11, three projectors PJ1, PJ2, and PJ3 are disposed around the cylindrical-shaped screen device 100.

In the screen device of the image display system of the fourth embodiment, the screens 101 each with a slit S are used, thereby allowing people to pass through the cylindrical-shaped screen device 100 along the projection direction of the projectors PJ1, PJ2, and PJ3.

Also in the image display system of the fourth embodiment, image projection is preformed with respect to the screen device 100 by the projectors PJ1, PJ2, and PJ3 from various angles. The resulting images are thus each provided with a three-dimensional appearance, and the image display system of the fourth embodiment can be used differently from those of the first to third embodiments.

As one exemplary use, the image display system of the fourth embodiment may be placed in a center hall or others in a large-sized building such as an Sairport, and the projections PJ1, PJ2, and PJ3 may project thereto images of guidance display varying in type. If the image display system of the fourth embodiment is placed in event sites and showrooms, for example, the resulting effects production can be strikingly new.

As a modified example of the image display system of the fourth embodiment, the loops may be each in the shape of a polygon. If this is the case, when the screen device 100 is viewed from above, the screens 101 are so disposed as to form a plurality of polygons, and the polygons are so disposed as to form a plurality of layers.

Figure 12A:
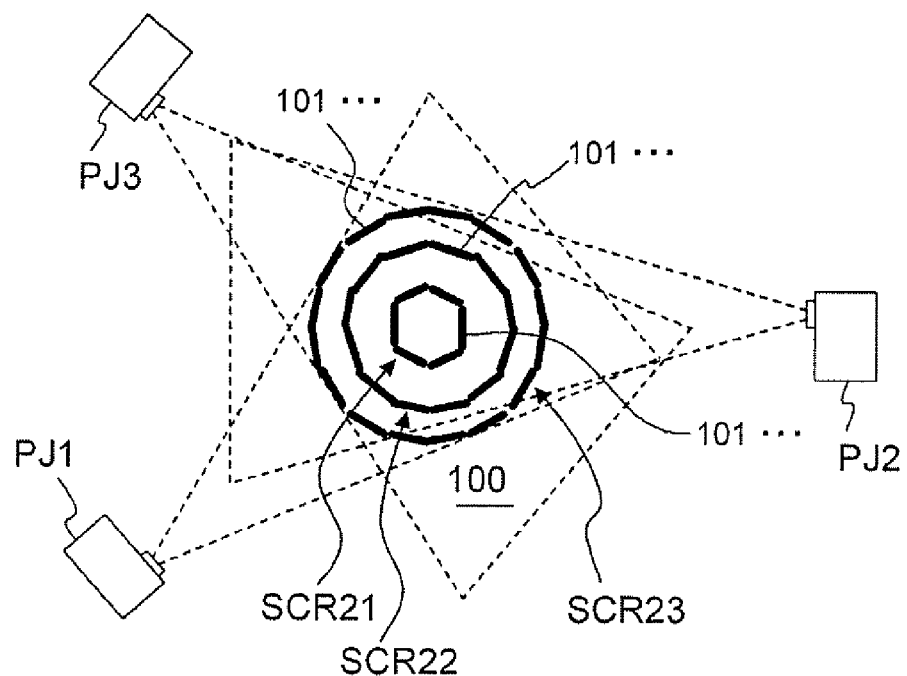
FIGS. 12A and 12B are each a diagram showing a case where a screen device is shaped like a polygonal prism as an exemplary modification of the image display system of the fourth embodiment.
Figure 12B:
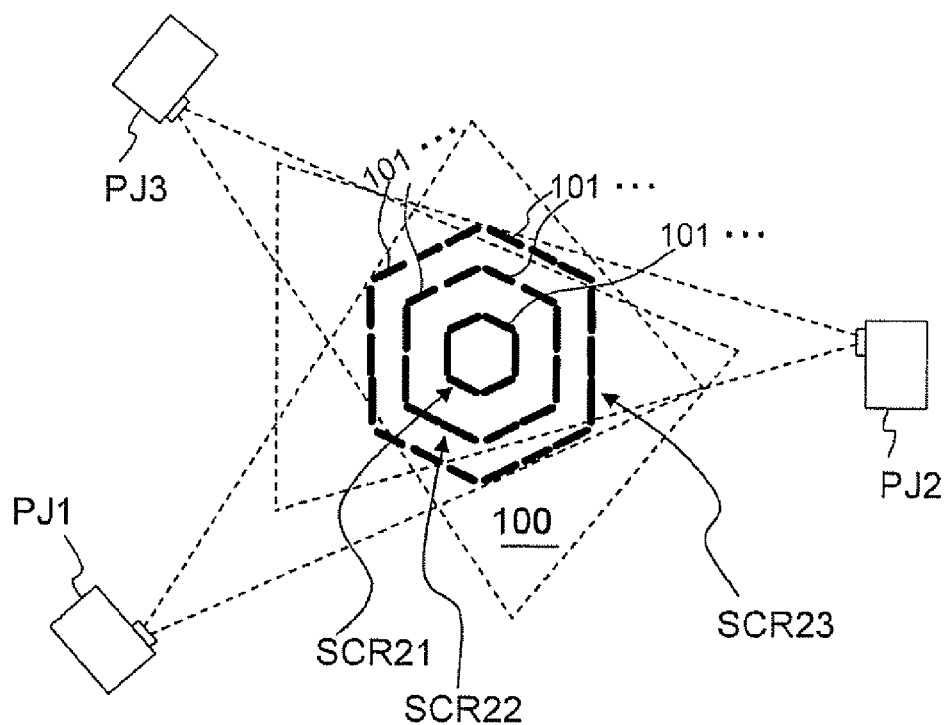

FIGS. 12A and 12B are each a diagram showing a modified example of the image display system of the fourth embodiment. FIGS. 12A and 12B are each a plan view of the image display system viewed from above similarly to FIG. 3B referred to for describing the image display system of the first embodiment. Note that, in FIGS. 12A and 12B, the entire configuration including the Support system 110 and others is similar to that of FIG. 1.

With the screen device 100 of the image display system of FIGS. 12A and 12B, when the screen device 100 is viewed from above, three polygons sharing the same center axis are formed. As such, the screen device 100 of the image display system of FIGS. 12A and 12B is the one configured by three screens each shaped like a polygonal prism. These three polygonal-prism-shaped screens are hereinafter referred to as, from the one closest to the center axis, first polygonal-prism-shaped screen SCR 21, second polygonal-prism-shaped screen SCR 22, and third polygonal-prism-shaped screen SCR 23.

The screens configuring the first to third polygonal-prism-shaped screens SCR 21 to SCR 23 may be any of those used in the screen device 100 of the image display systems in the first to third embodiments, i.e., the screens 101 (refer to FIGS. 3A and 3B), the screens 101 each formed with a slit S (refer to FIGS. 8A and 8B), and the screens 101 each shaped like a belt (refer to FIGS. 10A and 10B). In the examples of FIGS. 12A and 12B, exemplified is a case of using the band-shaped screens 101 (refer to FIGS. 10A and 10B).

FIG. 12A shows an example in which, when the screen device 100 is viewed from above, the first to third polygonal-prism-shaped screens SCR 21 to SCR 23 are each formed with a polygon whose side is the length of the band-shaped screen 101 in the width direction, i.e., length in y-axis direction in FIGS. 10A and 10B.

FIG. 12B shows an example in which, when the screen device 100 is viewed from above, the first polygonal-prism-shaped screen SCR 21 is formed with a polygon whose side is the length of the band-shaped screen 101 in the width direction, and the second polygonal-prism-shaped screen SCR 22 is formed with a polygon whose side is the length of the two band-shaped screens 101 in the width direction. The third polygonal-prism-shaped screen SCR 23 is formed with a polygon whose side is the length of the three band-shaped screens 101 in the width direction.

Note that, in Such FIGS. 12A and 12B examples, the polygon is assumed as being a hexagon, but this is surely not restrictive. Also in FIGS. 12A and 12B examples, the polygons are so disposed as to share the same center. This is also surely not restrictive, and these polygons do not necessarily share the same center as long as the deviation is small. Moreover, the screens configuring the first to third polygonal-prism-shaped screens SCR 21 to SCR 23 are not restrictive in number to those in FIGS. 12A and 12B examples. The number of the screens can be surely changed as appropriate depending on the size of the screen device 100 in its entirety or others.

Also when the screen device 100 is so shaped as shown in FIGS. 12A and 12B, the three projectors PJ1, PJ2, and PJ3 are disposed around the screen device 100.

Also with the screen device 100 configured as shown in FIGS. 12A and 12B, the resulting images can be thus each provided with a three-dimensional appearance similarly to those of the screen device of FIG. 11.

Note that, in the image display system of the fourth embodiment of FIGS. 11, 12A, and 12B, exemplified is the case of placing the three projectors PJ1, PJ2, and PJ3 around the screen device 100. Alternatively, more projectors may be disposed, or similarly to the first to third embodiments, the two projectors PJ1 and PJ2 may be so disposed as to oppose each other with the screen device 100 sandwiched therebetween.

Fifth Embodiment

An image display system of a fifth embodiment configures a screen device with the screens 101 placed in a lattice.

Figure 13:
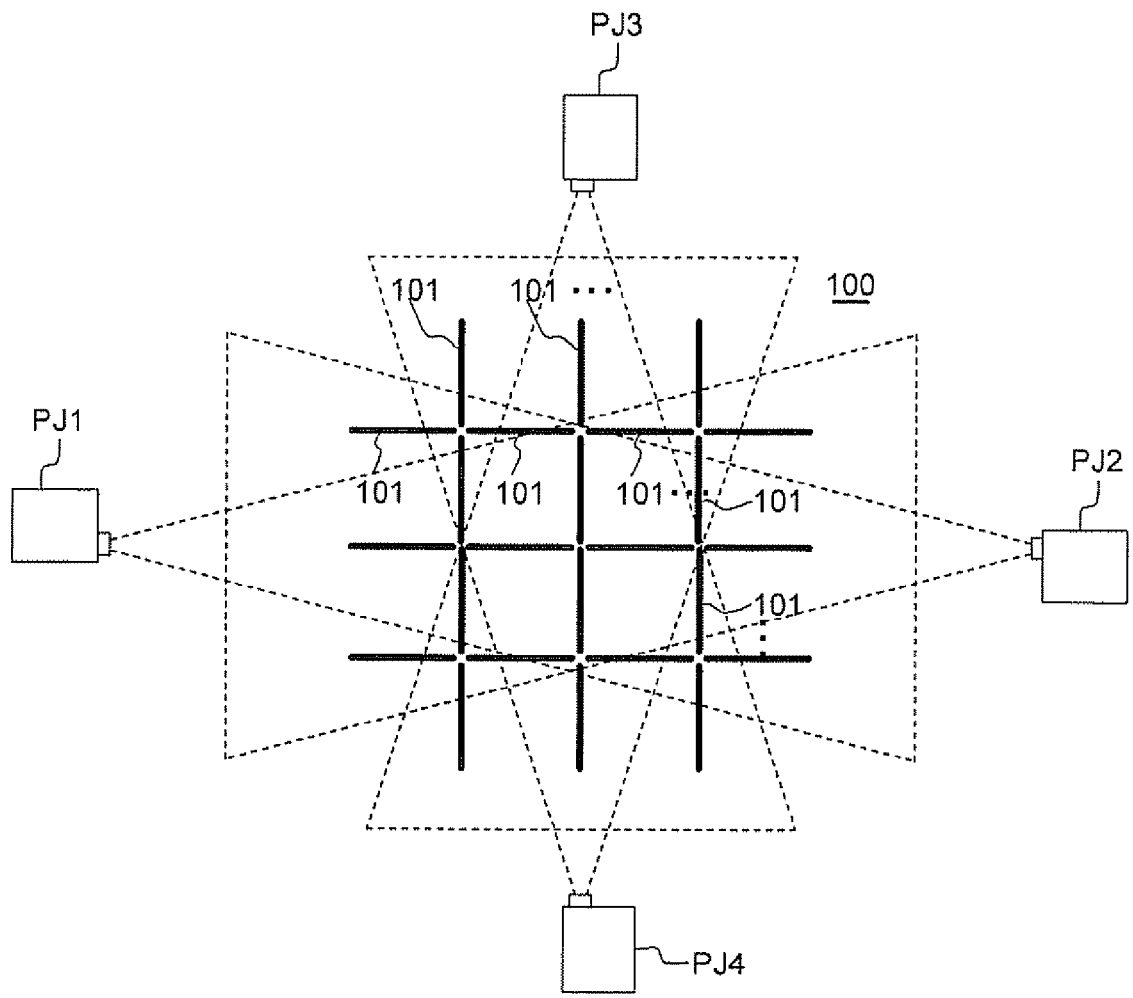
FIG. 13 is a diagram schematically showing the configuration of an image display system of a fifth embodiment.

FIG. 13 is a diagram schematically showing the configuration of the image display system of the fifth embodiment.

FIG. 13 is a plan view of the screen device 100 viewed from above similarly to FIG. 3B referred to for describing the image display system of the first embodiment. Note that, in FIG. 13, the entire configuration including the support system 10 and others is similar to that of FIG. 1.

As shown in FIG. 13, the screen device 100 of the image display system of the fifth embodiment is so configured that the screens 101 are disposed in a lattice. With respect to the screen device 100 configured as such, four projectors PJ3 to PJ4 are so disposed as to enable image projection from the four directions. Note that, in the image display system of FIG. 13, the number of the projectors and the placement thereof can be changed as appropriate depending on the size of the screen device, for example. In FIG. 13, the lattice forms a grid of squares. However, the grid may be formed of other polygons and need not be uniform.

With the image display system of the fifth embodiment, the screen device 100 is subjected to image projection from four directions, thereby enabling image display on the four surfaces of the screen device 100. Accordingly, the resulting images can be displayed differently from those by any previous two-dimensional screen device. The images are also displayed differently from those by any screen device shaped like a cylinder or a polygonal prism.

While the invention has been described in detail, the foregoing description is in all aspects illustrative and not restrictive. It is understood that numerous other modifications and variations as following 1 to 3 can be devised without departing from the scope of the invention.

1. In the image display systems of the embodiments described above, two or more projectors may be placed to each of the both sides of the screen device 100. Such a configuration enables the projection and stack projection. With the projection, images from the two or more projectors are placed in a line on each of the screen surfaces 101a of the screens 101 of the screen device 100, and with stack projection, displayed is an image being a result of overlay of images from the two or more projectors.

In FIGS. 3A and 3B examples, two projectors may be placed on the side of the projector PJ1 and the side of the projector PJ2, and using the two projectors on the both sides, the projection and stack projection may be performed, for example.

Figure 14A:
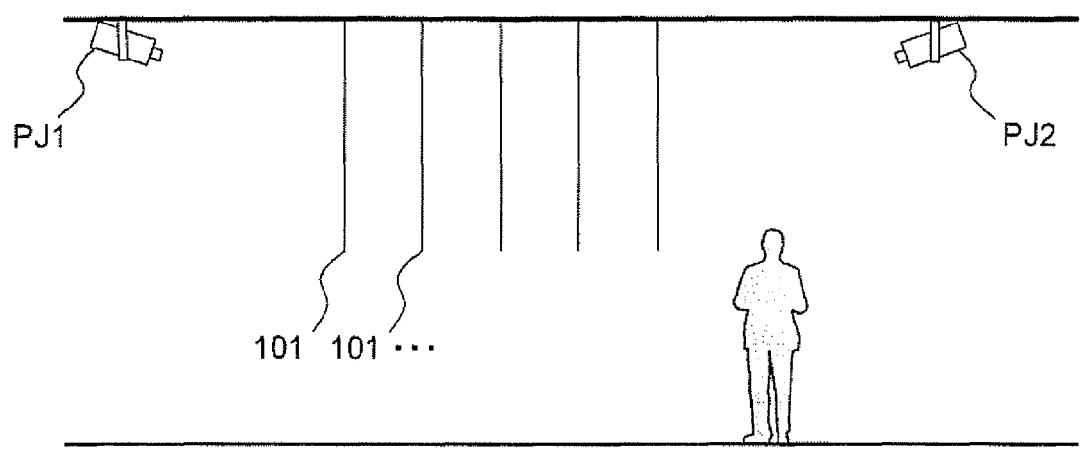
FIGS. 14A and 14B are each a diagram showing, in a simplified manner, another exemplary use of the image display systems of embodiments of the invention.
Figure 14B:
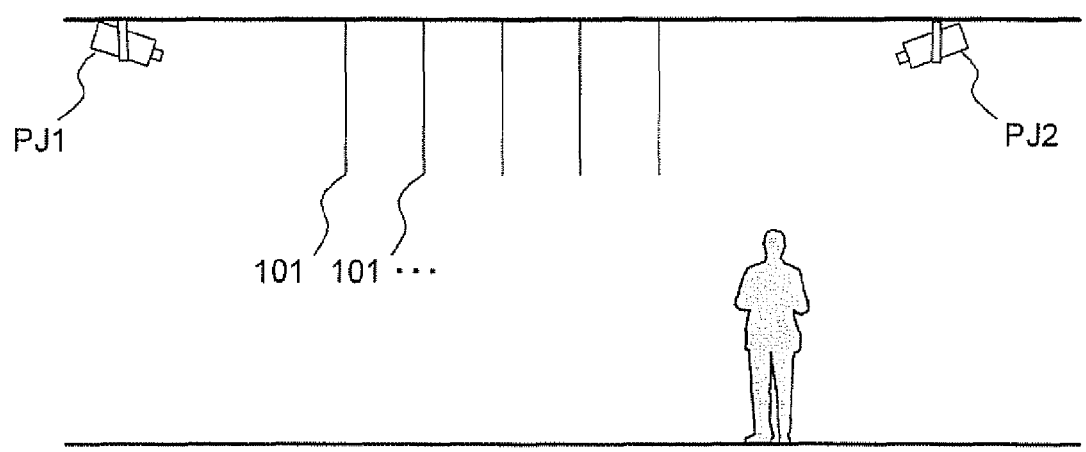

2. The screen placement is not restricted to those in the embodiments described above, and as shown in FIGS. 14A and 14B, various other screen placements are possible. FIG. 14A shows an example in which a plurality of screens 101 are hung from the ceiling at the height of about a grown-up of average height, and FIG. 14B shows an example in which a plurality of screens 101 are hung from the ceiling at the position higher than the height of about a grown-up of average height.

3. In the embodiments described above, exemplified is a case where the screens 101 are so opposed that their screen surfaces 101a are in parallel. The screen surfaces 101a are not necessarily in parallel, and may be opposed each other with a predetermined angle. The interval of the screen surfaces 101 also need not be the same, and the value may be arbitrarily set. The number of the screens configuring the screen device 100 can be set as appropriate depending on the placement location and applications of the image display system.

The foregoing description has been given by way of example only and it will be appreciated by a person skilled in the art that modifications can be made without departing from the scope of the present invention.

What is claimed is:

1. An image display system, comprising:
at least two projectors; and
a screen device that displays a projection image being a projection result from the at least two projectors,
the screen device including:
a plurality of light diffusion units, each having characteristics of light transmission and characteristics of light diffusion, wherein
among the plurality of light diffusion units, the projection image is diffused by a second light diffusion unit after passing through a first light diffusion unit, and
the at least two projectors simultaneously project light substantially equal in size to at least two corresponding light diffusion units respectively positioned furthest therefrom, and the light of said each of the at least two projectors intersects with each other.

2. The image display system according to claim 1,
the at least two projectors are provided for image projection from various directions with respect to the screen device.

3. The image display system according to claim 2,
when two of the at least two projectors are disposed to face each other on one and the other sides with the screen device disposed therebetween, a first projector of the at least two projectors being disposed on the other side projects a mirror image of the projection image coming from a second projector of the at least two projectors being disposed on the one side.

4. The image display system according to claim 1,
each of the light diffusion units being made of a fabric material that can move to swing under external forces.

5. The image display system according to claim 1,
each of the plurality of light diffusion units being provided with at least one slit.

6. The image display system according to claim 1,
the plurality of light diffusion units being disposed to derive a placement in which a light transmission surface of any one of the light diffusion units is faced to a light diffusion surface of any other one of the light diffusion units adjacent in a projection direction of the at least two projectors.

7. The image display system according to claim 1,
the light diffusion units being disposed to form a plurality of loops when the screen device is viewed from the above, and the plurality of loops being disposed to form a plurality of layers.

8. The image display system according to claim 7,
each of the plurality of loops being in a circular shape.

9. The image display system according to claim 7,
each of the plurality of loops being in a polygonal shape.

10. The image display system according to claim 1,
the plurality of light diffusion units being disposed in a lattice when the screen device is viewed from the above.

11. An image display method of displaying a projection image being a projection result from at least two projectors, comprising:
displaying the projection image onto a screen device that includes a plurality of light diffusion units, each of the plurality of light diffusion units having characteristics of light transmission and characteristics of light diffusion, wherein
among the plurality of light diffusion units, the projection image is diffused by a second light diffusion unit after passing through a first light diffusion unit, and
the at least two projectors simultaneously project light substantially equal in size to at least two corresponding light diffusion units respectively positioned furthest therefrom, and the light of said each of the at least two projectors intersects with each other.

12. A screen device displaying a projection image being a projection result from at least two projectors, comprising:
- a plurality of light diffusion units that each has characteristics of light transmission and characteristics of light diffusion,
- among the plurality of light diffusion units, the projection image being diffused by a second light diffusion unit after passing through a first light diffusion unit,
- wherein the at least two projectors simultaneously project light substantially equal in size to at least two corresponding light diffusion units respectively positioned furthest therefrom, and the light of said each of the at least two projectors intersects with each other.

13. A projection system, comprising:
- a plurality of projection units, each of the plurality of projection units projecting a respective image; and
- a plurality of projection screens, at least a portion of the plurality of projection screens displaying a displayed image that is collectively formed by the respective images projected by at least two of the plurality of projection units of the plurality of projection units;
- each of the plurality of projection screens transmitting at least a first predetermined amount of light that is incident on a respective projection screen;
- each of the plurality of projection screens diffusing at least a second predetermined amount of light that is incident on the respective projection screen; and
- wherein the plurality of projection units simultaneously project light substantially equal in size to the projection screens respectively positioned furthest therefrom, and the light of said each of the plurality of projection units intersects with each other.

14. The projection system according to claim 13,
- the plurality of projection screens being provided in an m×n matrix formation,
- m being a positive integer equal to or greater than 1; and
- n being a positive integer greater than 1.

15. The projection system according to claim 13,
- the plurality of projection screens being divided into a plurality of subsets, each of the subsets having a fraction of the plurality of projection screens;
- each of the subsets being provided in at least one of the following screen formations:
  (i) a circular formation; and
  (ii) a polygon formation;
- the subsets being arranged and radially extending from a center point that each of the subsets has in common.

16. The projection system according to claim 13, further comprising:
- a plurality of image sensors that detects at least a portion of the displayed image formed on at least one of the plurality of projection screens.

17. The projection system according to claim 13,
- each of the plurality of projection units being configured to project the respective image, the respective image being at least partially determined based on at least one of:
  (i) a position of each of the plurality of projection units;
  (ii) a position of each of the plurality of projection units relative to a position of at least one other of the plurality of projection units;
  (iii) a position of at least one of the plurality of projection screens; and
  (iv) a presence of an obstacle being provided between at least one of the plurality of projection units and at least one of the plurality of projection screens.

18. The projection system of claim 13,
- at least one of the plurality of projection screens including at least one slit; or
- at least one of the plurality of projection screens being made of super-ultra thin fiber having 7 deniers or less.

19. The projection system of claim 13,
- the plurality of projection screens being arranged in a 1×m matrix formation;
- m being a positive integer greater than 1;
- the plurality of projection screens having a first incident surface and a second incident surface, the first incident surface being on an side that is opposite to a side having the second incident surface;
- a first subset of the plurality of projection units being arranged to project incident light on the first incident surface of one of the plurality of projection screens;
- a fraction of the light incident on the first incident surface passing through the one of the plurality of projection screens and thereafter sequentially through the remaining projection screens of the plurality of projection screens;
- a second subset of the plurality of projection units being arranged to project incident light on the second incident surface;
- the first subset of the plurality of projection units projecting an first image;
- the second subset of the plurality of projection units projecting a second image; and
- the second image being a mirror image of the first image.

20. The projection system of claim 13, further comprising:
- a control unit that controls input signals that are respectively input into the plurality of projection units such that each of the plurality of projection units project the respective image;
- control unit controlling the input signals respectively input into the plurality of projection units at least partially based on at least one of:
  (i) positioning of at least one of the plurality of projection units;
  (ii) a relative position of at least one of the plurality of projection units with respect to another of the plurality of projection units;
  (iii) a position of at least one of the plurality of projection screens;
  (iv) a presence of an obstacle being provided between at least one of the plurality of projection units and at least one of the plurality of projection screens; and
  (v) a desired image to be collectively displayed on the plurality of projection screens.

21. The image display system according to claim 1, wherein the second light diffusion unit diffuses the projection image that has been transmitted from the first light diffusion unit while, at the same time, the first light diffusion unit diffuses the projection image that has been transmitted from the second light diffusion unit.

22. The image display system according to claim 1, the light diffusion units having a higher transmittance than diffusivity.

23. The image display system according to claim 1, wherein the light diffusion units constantly stay in a diffusion state.

* * * * *